(12) United States Patent
Jackson

(10) Patent No.: US 9,195,265 B1
(45) Date of Patent: Nov. 24, 2015

(54) MULTI-FUNCTION ATTACHMENT FOR A MOBILE COMPUTER

(71) Applicant: Tyrone D. Jackson, Oklahoma City, OK (US)

(72) Inventor: Tyrone D. Jackson, Oklahoma City, OK (US)

( * ) Notice: Subject to any disclaimer, the term of this patent is extended or adjusted under 35 U.S.C. 154(b) by 211 days.

(21) Appl. No.: 13/901,809

(22) Filed: May 24, 2013

(51) Int. Cl.
*G06F 1/16* (2006.01)
*H05K 5/00* (2006.01)

(52) U.S. Cl.
CPC .................................. *G06F 1/1611* (2013.01)

(58) Field of Classification Search
CPC .................................................... G06F 1/1616
USPC .................................................... 361/679.27
See application file for complete search history.

(56) References Cited

U.S. PATENT DOCUMENTS

| | | | | |
|---|---|---|---|---|
| 4,032,232 A * | 6/1977 | Perthes | 355/75 |
| 4,094,598 A * | 6/1978 | Hodges | 353/76 |
| 4,475,705 A * | 10/1984 | Henneberg et al. | 248/447.2 |
| 4,958,907 A * | 9/1990 | Davis | 359/809 |
| 5,035,392 A * | 7/1991 | Gross et al. | 248/442.2 |
| D327,501 S * | 6/1992 | Maloney | D19/88 |
| 5,122,941 A * | 6/1992 | Gross et al. | 362/276 |
| 5,379,201 A * | 1/1995 | Friedman | 362/191 |
| 5,383,642 A | 1/1995 | Strassberg | |
| 5,697,594 A | 12/1997 | Adams | |
| 5,725,191 A | 3/1998 | Nemeth | |
| 5,746,408 A * | 5/1998 | Theirl et al. | 248/295.11 |
| 5,769,378 A * | 6/1998 | Correa | 248/442.2 |
| 5,797,570 A * | 8/1998 | Dolan et al. | 248/205.3 |
| 5,841,553 A * | 11/1998 | Neukermans | 358/494 |
| 5,880,928 A * | 3/1999 | Ma | 361/679.27 |
| 5,881,986 A * | 3/1999 | Hegarty | 248/442.2 |
| D410,251 S * | 5/1999 | Murrell | D14/347 |
| 5,980,124 A * | 11/1999 | Bernardi et al. | 396/428 |
| 6,024,337 A * | 2/2000 | Correa | 248/442.2 |
| 6,068,227 A * | 5/2000 | Morgan et al. | 248/278.1 |
| 6,173,936 B1 * | 1/2001 | Hegarty | 248/442.2 |
| 6,181,550 B1 * | 1/2001 | Kim | 361/679.06 |
| 6,186,636 B1 * | 2/2001 | Naghi et al. | 362/85 |
| 6,260,984 B1 * | 7/2001 | Naghi et al. | 362/186 |
| 6,290,200 B1 * | 9/2001 | Ko | 248/442.2 |
| 6,417,894 B1 * | 7/2002 | Goff et al. | 348/832 |
| 6,441,872 B1 * | 8/2002 | Ho | 348/837 |
| 6,540,415 B1 * | 4/2003 | Slatter et al. | 396/428 |
| 6,799,861 B2 * | 10/2004 | Naghi et al. | 362/198 |
| 6,839,227 B1 * | 1/2005 | Correa | 361/679.23 |
| 6,851,656 B2 * | 2/2005 | Bauman et al. | 248/442.2 |
| 7,004,596 B2 * | 2/2006 | Merrem | 362/98 |
| 7,028,966 B2 * | 4/2006 | Bauman et al. | 248/442.2 |
| 7,048,245 B1 | 5/2006 | Voelker | |
| 7,153,212 B1 * | 12/2006 | Karten et al. | 463/47 |
| 7,362,477 B2 * | 4/2008 | Ishikawa et al. | 358/473 |

(Continued)

*Primary Examiner* — Courtney Smith
*Assistant Examiner* — Rashen E Morrison
(74) *Attorney, Agent, or Firm* — Neustel Law Offices

(57) ABSTRACT

A multi-function attachment for a mobile computer which includes a rotatable and vertically adjustable horizontal arm incorporating a scanner, lighting devices, a camera, a microphone, and retainers for documents. The multi-function attachment for a mobile computer generally includes a multi-function attachment assembly which is slidably and frictionally secured within an inner channel formed within the host device. The attachment assembly includes a horizontal arm rotatably secured to the distal end of a support shaft. The horizontal arm may incorporate a number of devices, such as document retainers, a camera, a microphone, one or more lights and/or a feed slot for scanning documents to the host device.

17 Claims, 11 Drawing Sheets

(56) References Cited

U.S. PATENT DOCUMENTS

| | | |
|---|---|---|
| 7,453,688 B2 * | 11/2008 | Wu et al. .................. 361/679.55 |
| 7,559,520 B2 * | 7/2009 | Quijano et al. ............ 248/309.1 |
| 7,611,117 B1 | 11/2009 | Lang, Jr. |
| 7,817,411 B2 * | 10/2010 | Lee et al. .................. 361/679.25 |
| 8,035,737 B2 * | 10/2011 | Hsu .............................. 348/376 |
| 8,042,781 B2 * | 10/2011 | Berman et al. ............. 248/316.8 |
| 8,056,812 B2 * | 11/2011 | Huang ......................... 235/486 |
| 8,102,331 B1 * | 1/2012 | Moscovitch .................. 345/1.1 |
| 8,152,331 B1 * | 4/2012 | Barton et al. ................. 362/220 |
| 8,177,390 B2 * | 5/2012 | Miskin ......................... 362/234 |
| 8,453,659 B2 * | 6/2013 | Li .................................. 135/16 |
| 8,781,311 B1 * | 7/2014 | Hatzav et al. ..................... 396/5 |
| 2005/0040298 A1 * | 2/2005 | Ohki et al. ................. 248/176.1 |
| 2005/0136853 A1 * | 6/2005 | Lenchik et al. ............. 455/90.3 |
| 2007/0035655 A1 * | 2/2007 | Chen et al. .................... 348/373 |
| 2007/0165135 A1 * | 7/2007 | Sukenari et al. ............. 348/373 |
| 2008/0151099 A1 * | 6/2008 | Lin et al. ...................... 348/376 |
| 2009/0323140 A1 * | 12/2009 | Moore et al. ................. 358/497 |
| 2010/0038514 A1 * | 2/2010 | Yu et al. ....................... 248/449 |
| 2010/0054721 A1 * | 3/2010 | Hsieh et al. ...................... 396/5 |
| 2010/0080543 A1 * | 4/2010 | Yu et al. ........................... 396/5 |
| 2011/0317402 A1 * | 12/2011 | Cristoforo .................... 362/106 |

* cited by examiner

MULTI-FUNCTION ATTACHMENT FOR A MOBILE COMPUTER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an attachment assembly and more specifically it relates to a multi-function attachment for a mobile computer which includes a rotatable and vertically adjustable horizontal arm incorporating a scanner, lighting devices, a camera, a microphone, and retainers for documents.

2. Description of the Related Art

Any discussion of the related art throughout the specification should in no way be considered as an admission that such related art is widely known or forms part of common general knowledge in the field.

Mobile computer devices such as laptops and tablet computers are rapidly overtaking the traditional desktop personal computer in both business and personal use. While such mobile computer devices are often known to incorporate cameras and microphones, they often lack any integrated copying/scanning functionality. Further, the cameras, microphones or any integrated lighting within such mobile computer devices are generally not adjustable for optimized positioning.

Because of the inherent problems with the related art, there is a need for a new and improved multi-function attachment for a mobile computer which includes a rotatable and vertically adjustable horizontal arm incorporating a scanner, lighting devices, a camera, a microphone, and retainers for documents.

BRIEF SUMMARY OF THE INVENTION

The invention generally relates to a mobile computing device which includes a multi-function attachment assembly which is slidably and frictionally secured within an inner channel formed within the host device. The attachment assembly includes a horizontal arm rotatably secured to the distal end of a support shaft. The horizontal arm may incorporate a number of devices, such as document retainers, a camera, a microphone, one or more lights and/or a feed slot for scanning documents to the host device.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
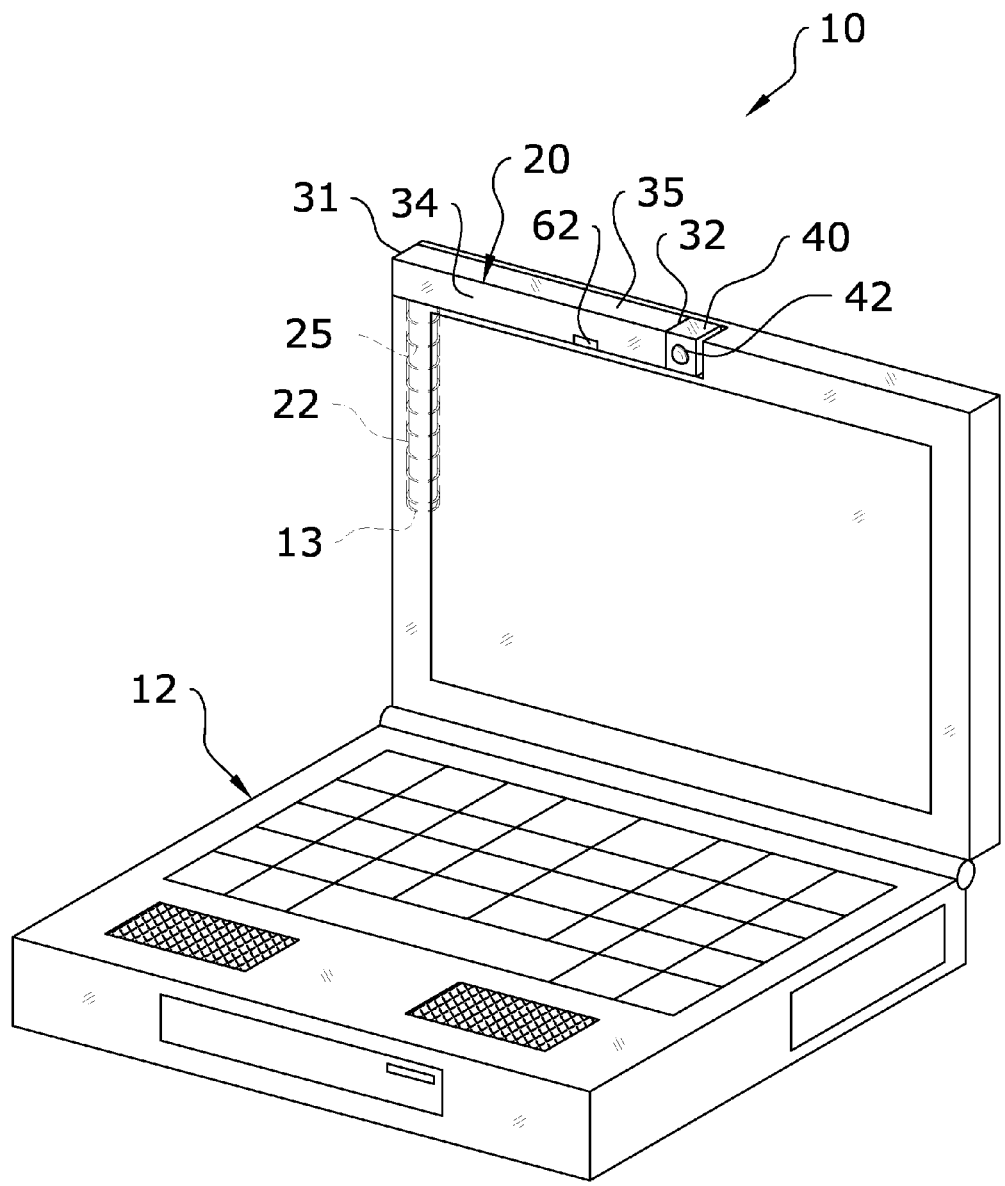
FIG. 1 is an upper perspective view of the present invention installed in a mobile computer.

Turning now descriptively to the drawings, in which similar reference characters denote similar elements throughout the several views, FIGS. 1 through 10 illustrate a multi-function attachment for a host device 10 such as a laptop computer, which comprises a multi-function attachment assembly 20 which is slidably and frictionally secured within an inner channel 13 formed within the host device 12. The attachment assembly 20 includes a horizontal arm 30 rotatably secured to the distal end 23 of a support shaft 22. The horizontal arm 30 may incorporate a number of devices, such as document retainers 60, a camera 42, a microphone 44, one or more lights 50, 52, 54 and/or a feed slot 38 for scanning documents 17 to the host device 12.

B. Mobile Computing Device

The present invention is adapted for use with a mobile computing device 12 such as a laptop as shown in the figures. It should be appreciated that a wide range of mobile computing devices 12 known in the art may be utilized in combination with the present invention described herein. Other embodiments may be incorporated with tablet computers, smart phones, computer monitors, and various other devices 12. Thus, the scope of the present invention should not be construed as being limited by the exemplary figures.

Figure 2:
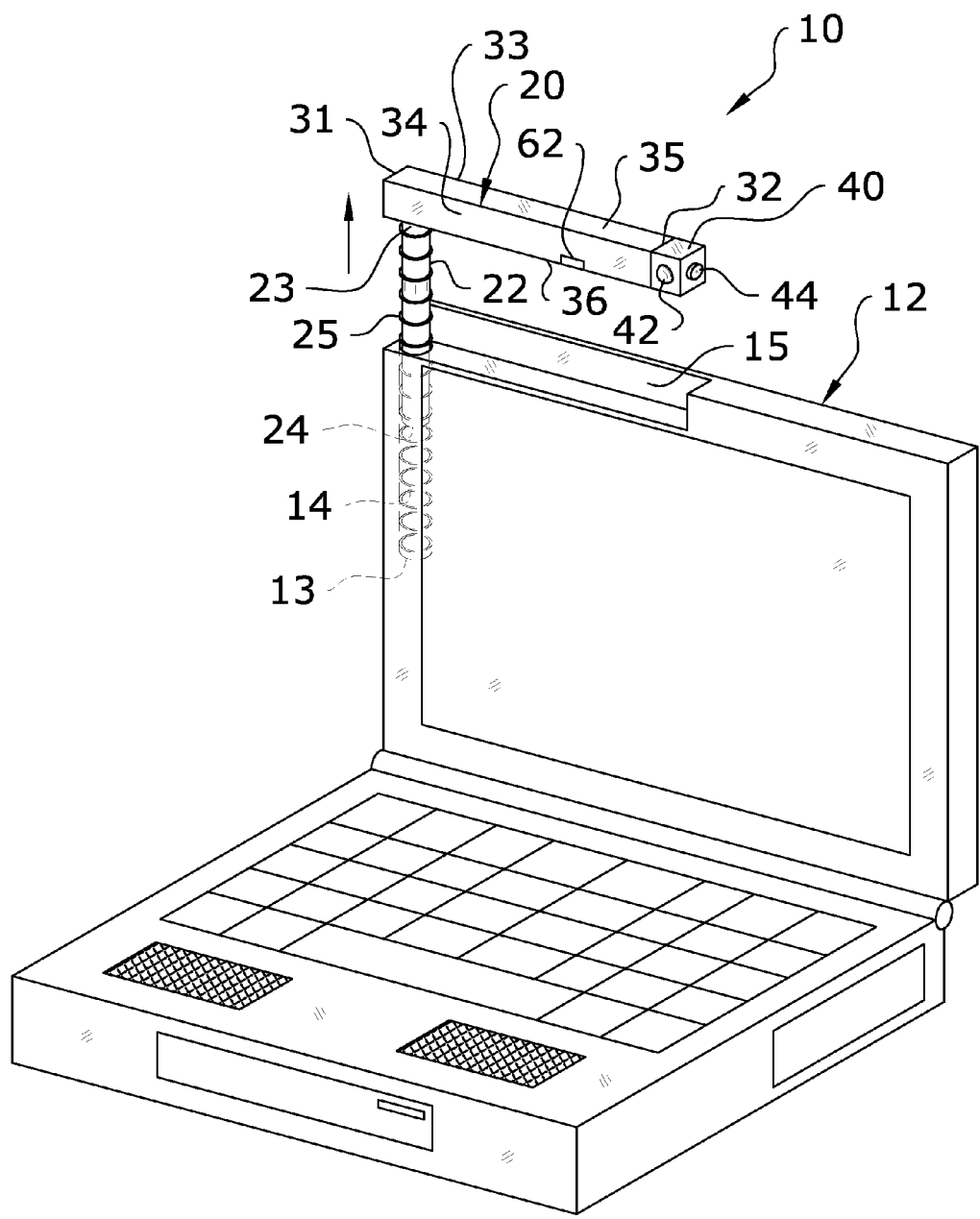
FIG. 2 is an upper perspective view of the multi-function attachment assembly being raised from the mobile computer.
Figure 3:
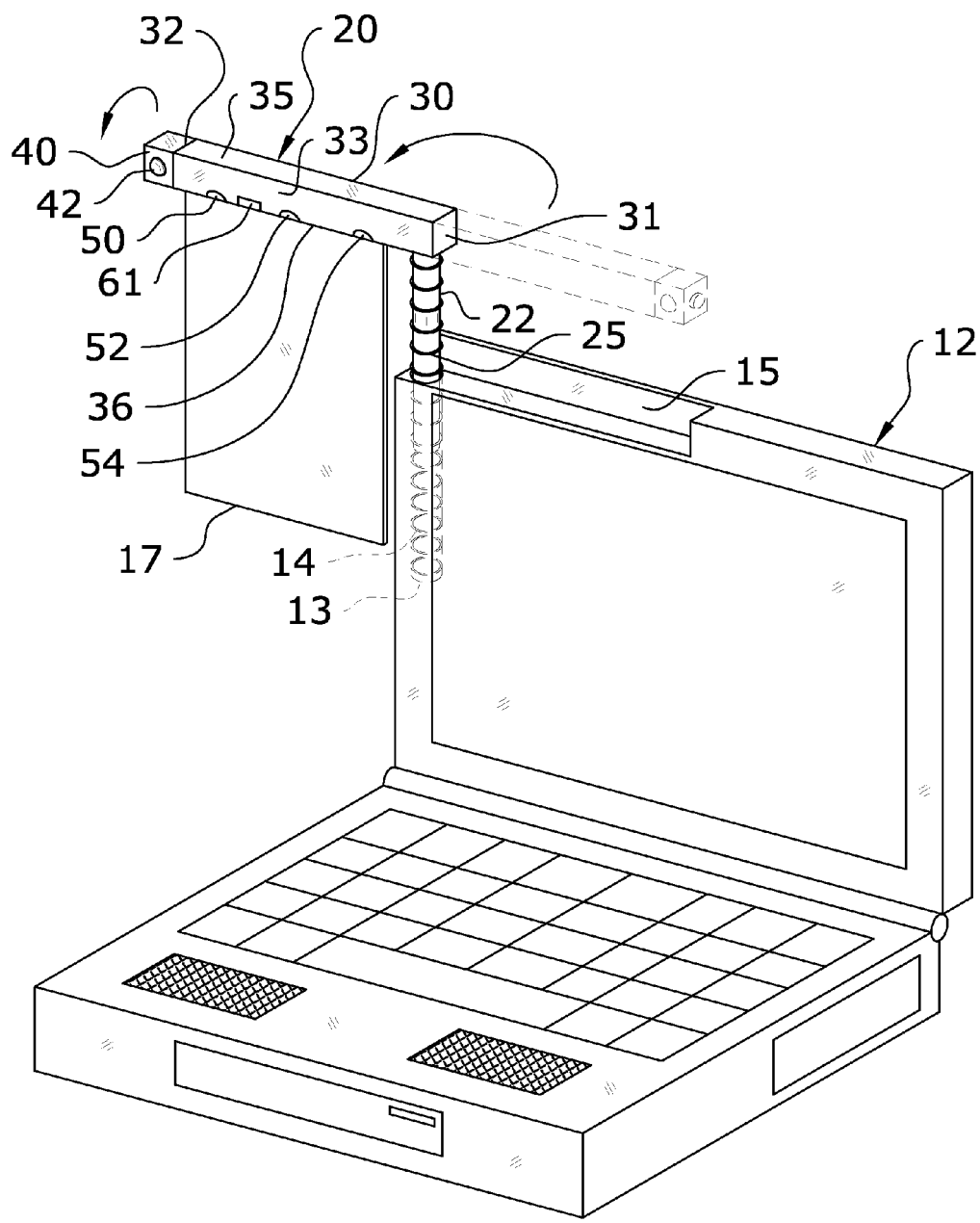
FIG. 3 is an upper perspective view illustrating rotation of the multi-function attachment assembly.

In a preferred embodiment, the present invention will be utilized in combination with a laptop computer 12. An inner channel 13 extends into the laptop 12, preferably into its monitor portion as shown in FIG. 1. An upper slot 15 may also be formed in the monitor portion of the laptop 12, such as at its upper end as best shown in FIGS. 2 and 3. The upper slot 15 will accommodate the horizontal arm 30 of the multi-function attachment assembly 20 when it is in a rested position.

The multi-function attachment assembly 20 is slidably and frictionally secured within the inner channel 13. The interior of the inner channel 13 may include grooves 14 or frictional engaging members such as rubber rings which will interact with corresponding frictional members 25 or grooves on the support shaft 22 of the multi-function attachment assembly 20.

C. Multi-Function Attachment Assembly

As shown throughout the figures, the present invention comprises a multi-function attachment assembly 20 which may be maneuvered into various positions for providing various functionality, such as a paper holder, camera, microphone, scanner, light and the like. The multi-function attachment assembly 30 includes a support shaft 22 which is slidably and frictionally secured to a mobile computer device 12 via a support shaft 22. A horizontal arm 30 is rotationally secured to an upper end 23 of the support shaft 22, the horizontal arm 30 including various components providing a range of functionality.

i. Support Shaft.

As best shown in FIGS. 4, 7, 9a and 9b, the attachment assembly 20 includes a vertical support shaft 22 which is rotatably and telescopically secured within the inner channel of the mobile computing device 12. The support shaft 22 is comprised of an elongated member, such as a rod, which includes an upper end 23 and a lower end 24.

A plurality of frictional members 25 may extend around the outer circumference of the support shaft 22 to frictionally engage with the inner walls of the inner channel 13. In some embodiments, the inner channel 13 may include grooves 14 which the frictional members 25 catch on to frictionally and slidably secure the shaft 22 in the channel 13. In other embodiments, the inner channel 13 may include frictional members and the support shaft 22 may include the grooves. In further embodiments, neither the inner channel 13 nor support shaft 22 include grooves or frictional members. In such embodiments, the width of the support shaft 22 will be slightly less than the width of the inner channel 13 so as to allow a frictional engagement while still permitting telescopic movement.

Figure 4:
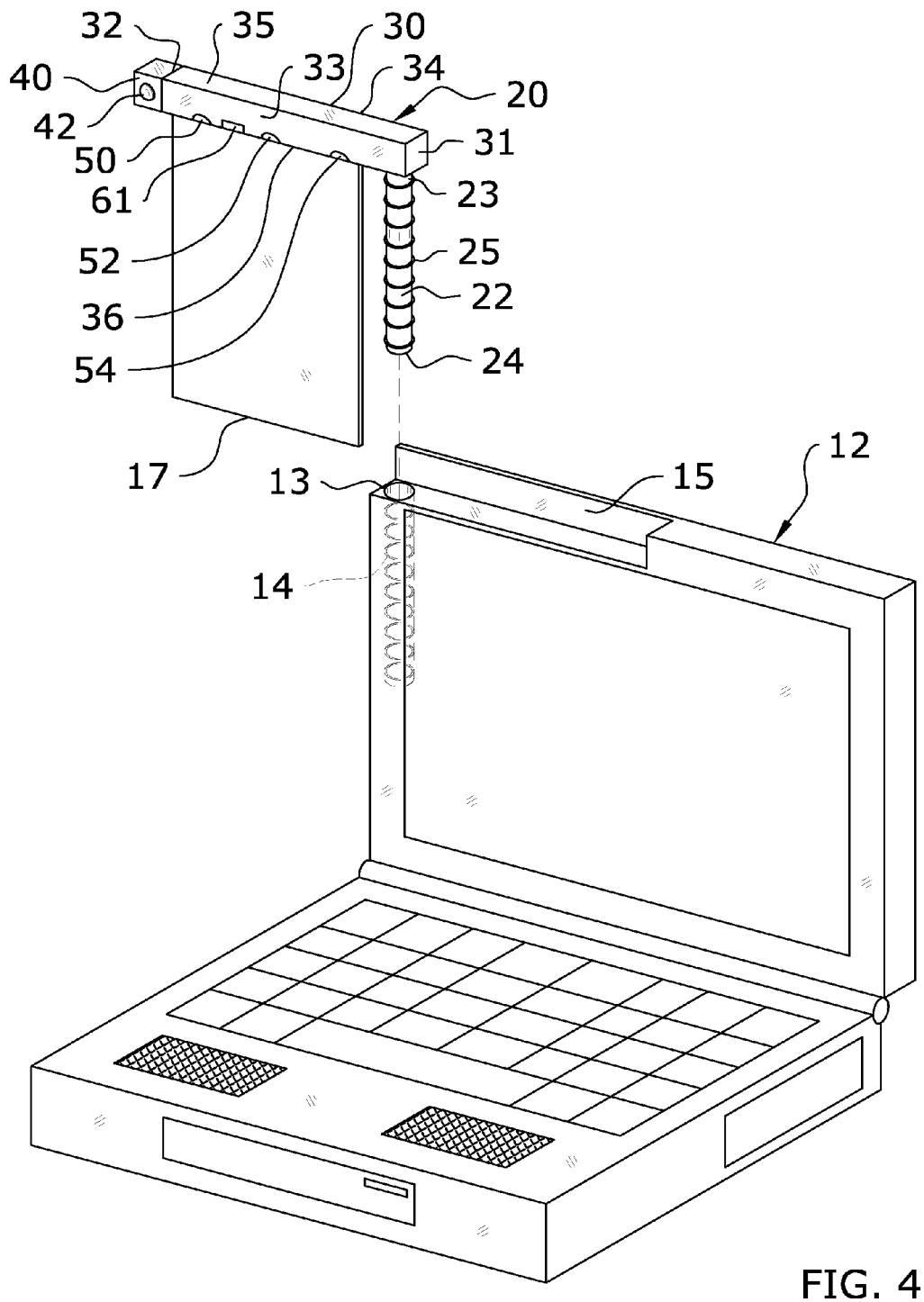
FIG. 4 is an upper perspective view of the mobile computer and multi-function attachment assembly of the present invention.

The lower end 24 of the support shaft 22 is preferably retained within the inner channel 13 of the mobile computing device 12. In some embodiments, the entire support shaft 22, including its lower end 24, may be removed from the inner channel 13 for cleaning or maintenance as shown in FIG. 4. The upper end 23 of the support shaft 22 includes the rotatably mounted horizontal member 30 as discussed below.

ii. Horizontal Arm.

FIGS. 2, 3, 6 and 10 best illustrate the horizontal arm 30 of the present invention. The horizontal arm 30 is rotatably secured to the upper end 23 of the support shaft 22 as best shown in FIG. 3. The horizontal arm 30 is generally comprised of an elongated member having a first end 31, a second end 32, a front end 33, a rear end 34, an upper end 35 and a lower end 36. Although the figures illustrate the horizontal arm 30 as comprising a rectangular cross-section, it is appreciated that alternate configurations may be utilized.

Figure 10:
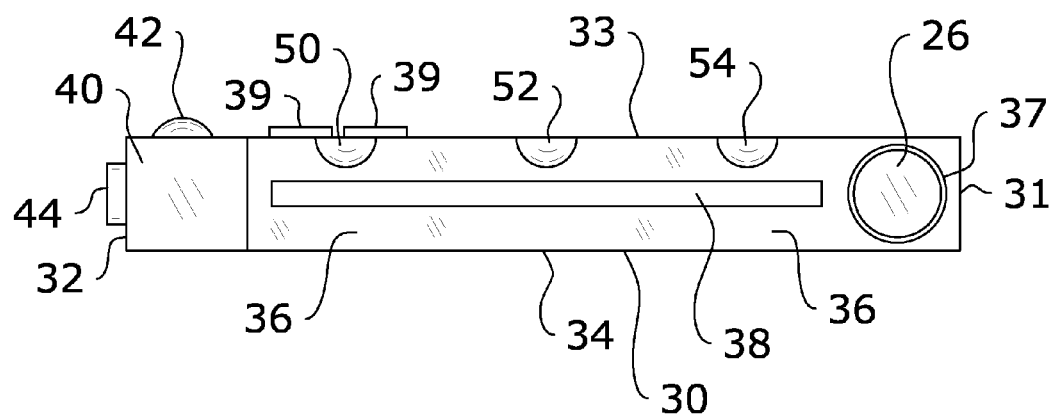
FIG. 10 is a top view of an alternate embodiment of the multi-function attachment assembly.

The first end 31 of the horizontal arm 30 is rotatably secured to the upper end 23 of the support shaft 22. An opening 37 adjacent to the first end 31 of the horizontal arm 30 matingly and rotationally receives the upper end 23 of the support shaft 22. In some embodiments, a rotational member 26 such as a bearing may be utilized to interface the horizontal arm 30 with the support shaft 22 as shown in FIG. 10.

iii. Camera Mount.

The horizontal arm 30 generally includes a camera mount 40 rotatably secured to its distal second end 32 as shown throughout the figures. The camera mount 40 may be integrally formed with the horizontal arm 30 or may be comprised of a discrete structure rotatably secured thereto. The camera mount 40 is preferably comprised of a cube-shaped rotatable attachment as best shown in FIG. 3. In some embodiments, the camera mount 40 may be removable from the horizontal arm 30.

The camera mount 40 generally includes an integrated camera 42 and microphone 44 positioned thereon. Various types of cameras 42 may be utilized, but a preferred embodiment will utilize a video camera such as a webcam. The camera 42 may be repositioned by rotation of the horizontal arm 30 with respect to the support shaft 22 and/or rotation of the camera mount 40 with respect to the horizontal arm 30. Thus, the camera 42 may be adjusted to capture a wide range of angles.

The microphone 44 is preferably comprised of a small microphone secured to the camera mount 40 so as to allow the microphone 44 to be easily repositioned for optimal capture of audio. In a preferred embodiment as best shown in FIG. 2, the microphone 44 will be positioned on the distal end of the camera mount 40. It should be appreciated, however, that the microphone 44 may be positioned at various other locations on the present invention, such as directly on the horizontal arm 30.

iv. Lights.

The present invention preferably includes a plurality of illumination devices 50, 52, 54 for aiding with reviewing documents 17 retained within the present invention in low light or dark conditions. Various configurations, types, numbers, and placements of illumination devices 50, 52, 54 may be utilized. The exemplary figures should not be construed as being limiting with respect to the configurations, types, numbers and/or placements of the illumination devices 50, 52, 54.

Figure 5:
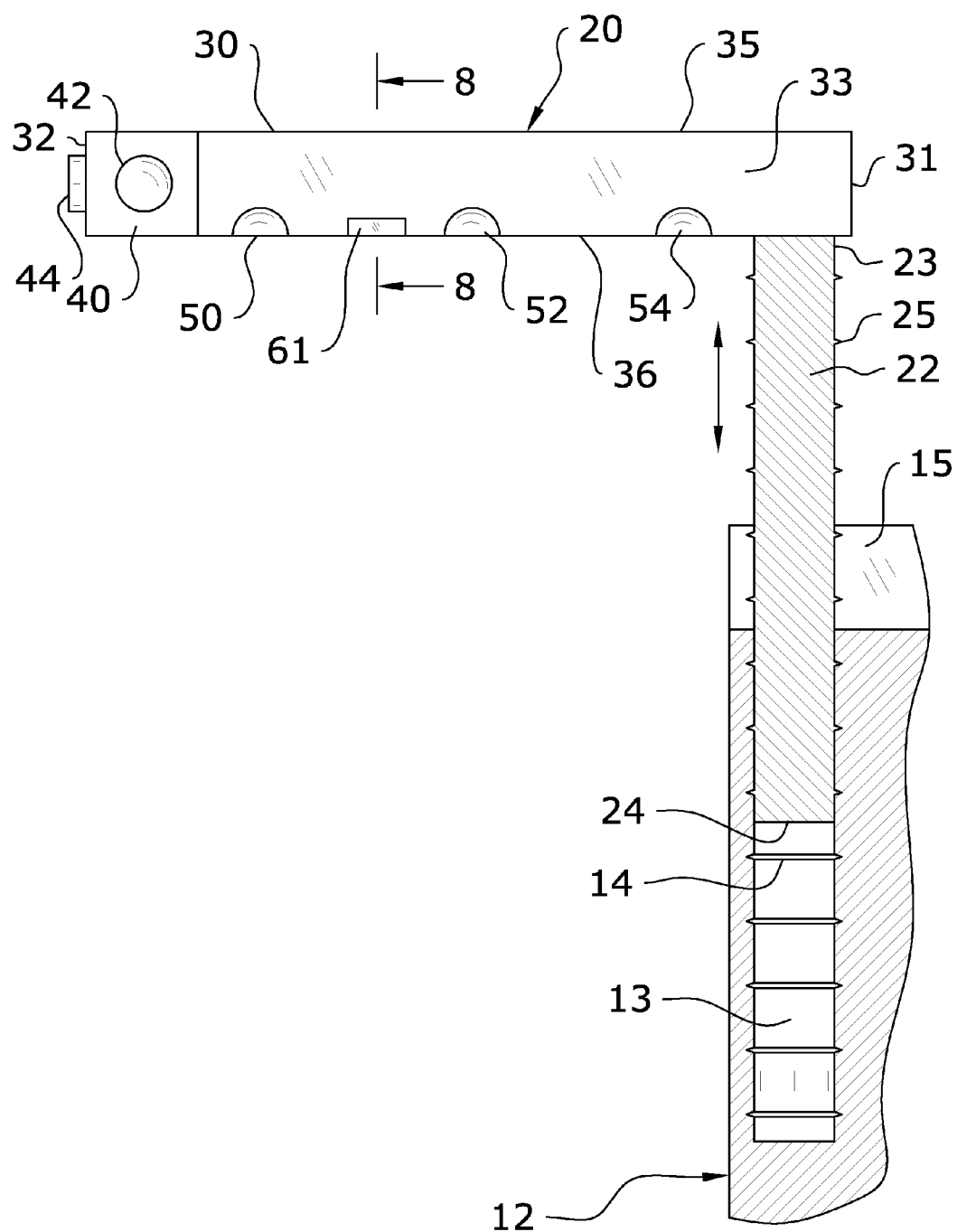
FIG. 5 is a frontal sectional view of the multi-function attachment assembly of the present invention.
Figure 6:
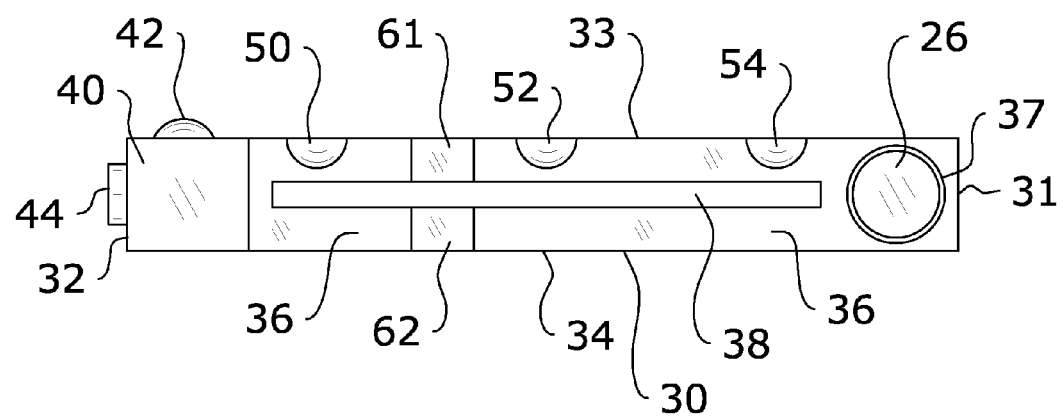
FIG. 6 is a top view of the multi-function attachment assembly of the present invention.
Figure 7:
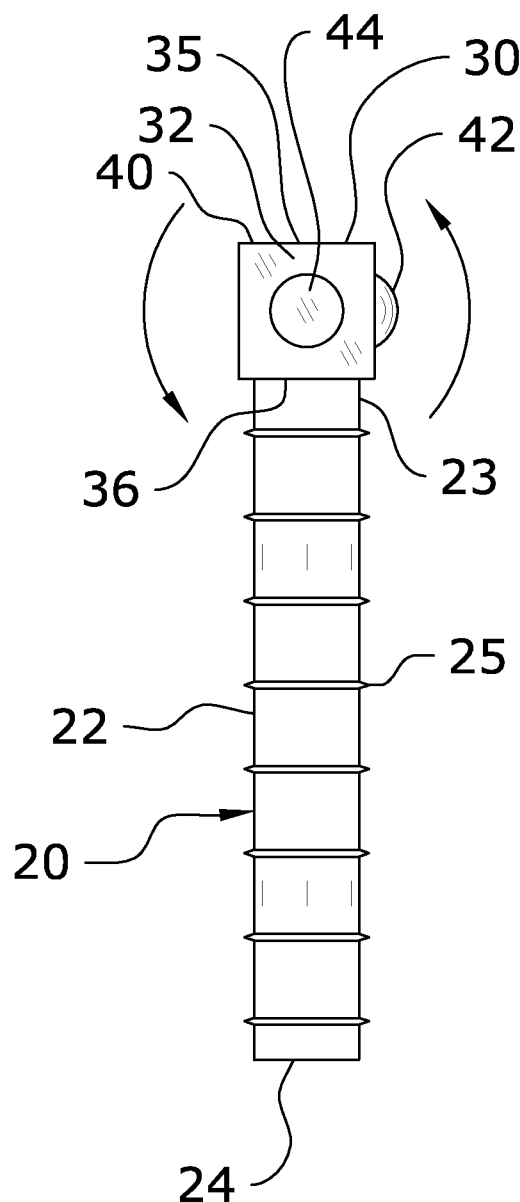
FIG. 7 is a side view of the multi-function attachment assembly of the present invention.

In a preferred embodiment as best shown in FIG. 5, a plurality of illumination devices 50, 52, 54 comprised of light emitting diodes will be positioned across the length of the front end 33 of the horizontal arm 30 adjacent to its lower end 24. For optimal lighting, a preferred embodiment will include a first illumination device 50 positioned across the front end 33 and lower end 36 of the horizontal arm 30 adjacent to its first end 31, a second illumination device 50 positioned across the front end 33 and lower end 36 of the horizontal arm 30 at approximately the mid-point of its length, and a third illumination device 54 positioned across the front end 33 and lower end 36 of the horizontal arm 30 adjacent to its second end 32.

v. Document Retainer/Scanner

The horizontal arm 30 of the attachment assembly 20 will preferably be adapted to removably secure documents 17 therein. In a preferred embodiment, a feed slot 38 will extend substantially across the length of the horizontal arm 30. In the embodiment shown in FIGS. 1-8, the feed slot 38 extends into the lower end 36 of the horizontal arm 30 but terminates before its upper end 35 is reached. In the embodiment shown in FIGS. 9a-10, the feed slot 38 extends fully between the lower end 36 and upper end 35 of the horizontal arm 30 so as to allow a document 17 to pass fully therethrough.

Figure 8:
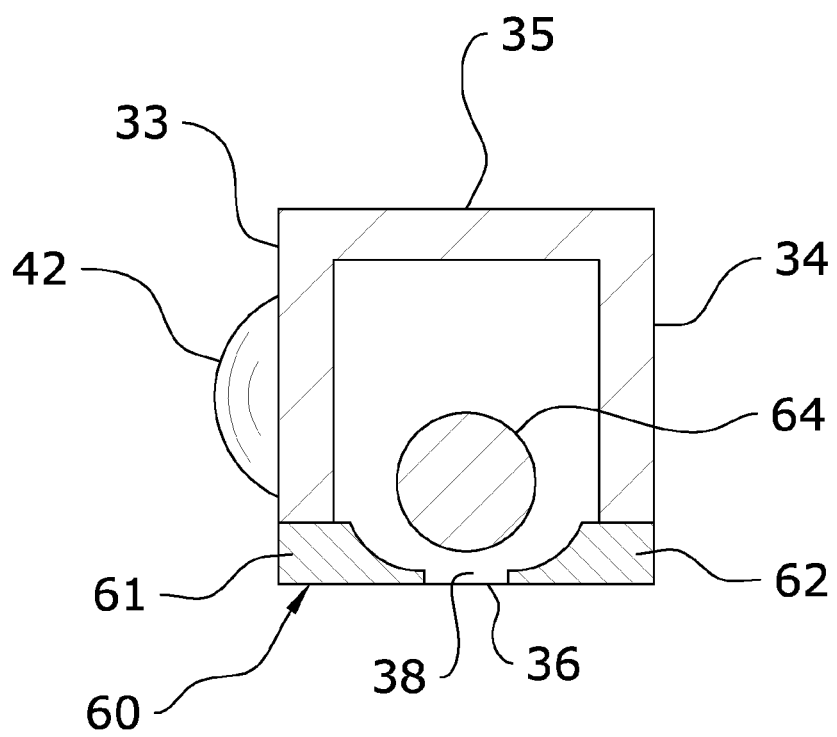
FIG. 8 is a sectional view of the multi-function attachment assembly taken along line 8-8 of FIG. 5.

As best shown in FIG. 8, one or more document retainers 60 may be positioned within the feed slot 38 to removably secure a document 17 therein. Various types of document retainers 60 known in the art to secure a document 17, such as clips and the like, may be utilized. One or more releases 61, 62 will preferably be incorporated to release the document 17 from the feed slot 38 when needed.

Figure 9A:
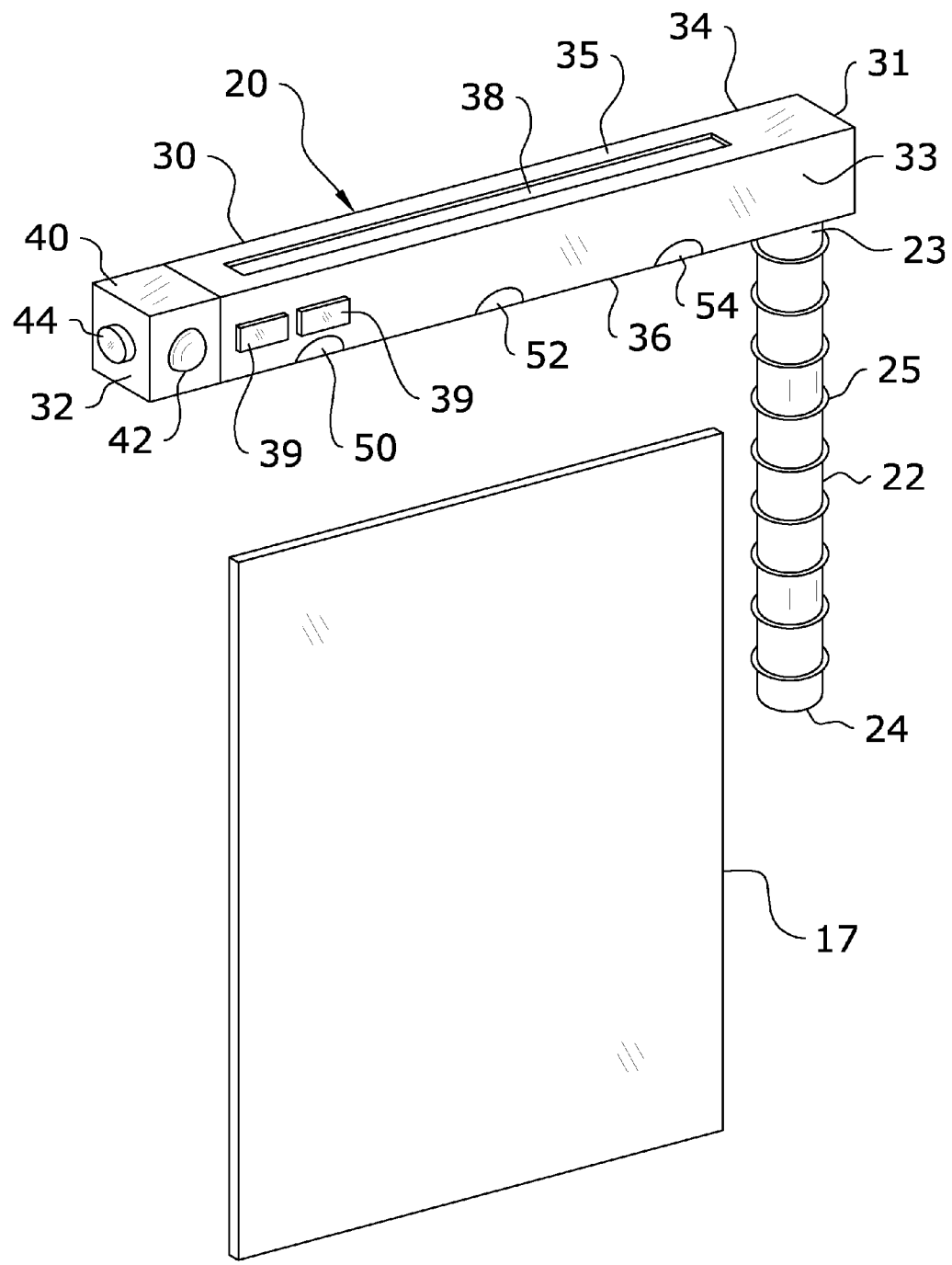
FIG. 9a is an upper perspective view of an alternate embodiment of the multi-function attachment assembly.
Figure 9B:
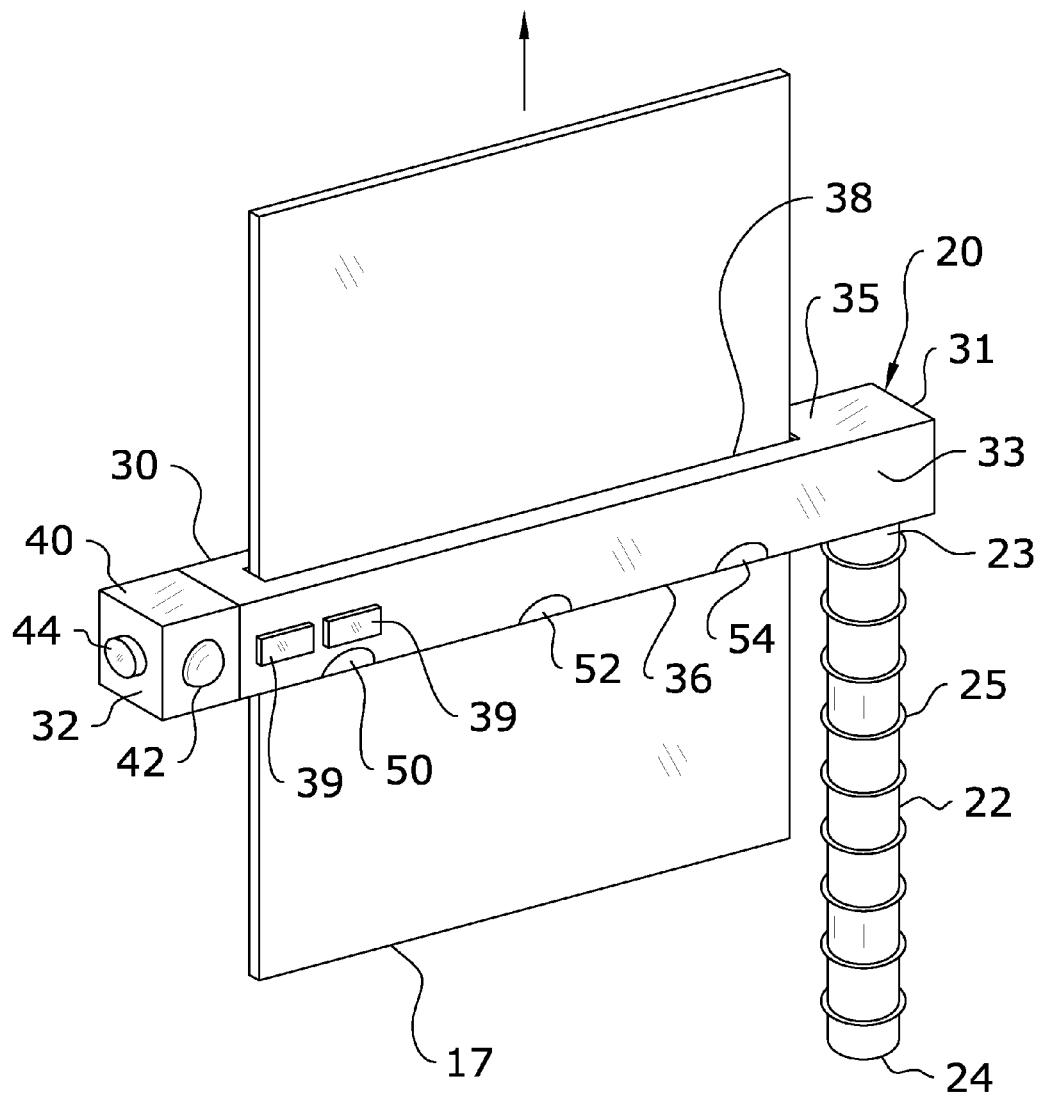
FIG. 9b is an upper perspective view of an alternate embodiment of the multi-function attachment assembly scanning a page.

In the embodiments of FIGS. 9a-10, the slot 38 includes a feed member 64 generally comprised of a rotating rod extending within the slot 38. The feed member 64 is best shown in FIG. 8. A scanner may be included within the horizontal arm 30 such that documents which are fed through the slot 38 will be scanned into file format and automatically transferred to the host device 12. One or more control buttons 39 may be included in the horizontal arm 30 to control the feed member 64 and/or scanning functionality of the present invention.

D. Operation of Preferred Embodiment

In use, the multi-function attachment assembly 20 may be pulled into an extended position by grasping the horizontal arm 30 and pulling upward, which will pull the support shaft 22 out of the inner channel 13. The use of grooves 14 and frictional members 25 will establish a frictional engagement between the support shaft 22 and inner channel 13 so as to allow the attachment assembly 20 to be maintained at various heights as needed.

With the attachment assembly 20 pulled upward to the desired vertical height, the horizontal arm 30 may be rotated so as to be properly positioned depending on the user's requirements. Various functionality may be performed using the attachment assembly 20. For example, the camera mount 40 may be rotated and the camera 42 used to stream or record video. Similarly, the adjustment of the camera mount 40 and/or horizontal arm 30 may be utilized to optimally position the microphone 44.

If needed, a document 17 may be retained in or suspended from the horizontal arm 30. In some embodiments, the horizontal arm 30 may include document retainers 60 such as clips to which the document 17 may be removably secured. In other embodiments, a document 17 may be retained by removably securing within a slot 38 extending partially into the horizontal arm 30. In other embodiments, the feed slot 38 may extend fully through the horizontal arm 30 and may include one or more releases 61, 62 which may be pressed to release the document 17 from the feed slot 38.

The feed slot 38 may also be utilized in some embodiments as a scanner to scan the document 17 fed therethrough to the host device 12, such as in PDF format. In such embodiments, the document 17 may be positioned within the feed slot 38 at which point it will be automatically fed into the feed slot 38 via the feed member 64. One or more control buttons 39 may be utilized to advance, recede, or scan the document 17 within the feed slot 38.

The one or more lights 50, 52, 54 may be activated through usage of control buttons 39 or by pressing each light 50, 52, 54 to activate or deactivate the same. Each of the lights 50, 52, 54 may be individually turned on or off so that any combination of lights 50, 52, 54 may be on or off at any time for most efficient lighting.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A multi-function attachment assembly for a host device, comprising:
   a support shaft frictionally and slidably secured within an inner channel formed within said host device, wherein said support shaft includes a plurality of frictional members positioned thereon;
   a horizontal arm rotationally secured to a distal end of said support shaft;
   one or more document retainers positioned on said horizontal arm, said one or more document retainers removably secure one or more documents therein; and
   one or more illumination devices positioned along a length of said horizontal arm; the horizontal arm including a feed slot extending between a lower and an upper end thereof so as to allow the passing of documents.

2. The multi-function attachment assembly of claim 1, wherein said host device is comprised of a computer monitor.

3. The multi-function attachment assembly of claim 1, further comprising a camera mount rotatably secured to a distal end of said horizontal arm.

4. The multi-function attachment assembly of claim 3, wherein said camera mount includes a camera secured thereto.

5. The multi-function attachment assembly of claim 4, wherein said camera mount includes a microphone secured thereto.

6. The multi-function attachment assembly of claim 1, wherein said one or more illumination devices are comprised of a first light emitting diode, a second light emitting diode and a third light emitting diode.

7. The multi-function attachment assembly of claim 1, further comprising a scanner within said feed slot, said scanner being adapted to scan said document to said host device.

8. The multi-function attachment assembly of claim 1, wherein said inner channel includes a plurality of grooves adapted to frictionally engage with said plurality of frictional members.

9. A multi-function attachment assembly for a host device, comprising: a support shaft frictionally and slidably secured within an inner channel formed within said host device; a horizontal arm rotationally secured to a distal end of said support shaft; one or more document retainers positioned on said horizontal arm, said one or more document retainers to removably secure one or more documents therein; a camera rotatably secured to a distal end of said horizontal arm; a microphone positioned on said horizontal arm; and one or more illumination devices positioned along a length of said horizontal arm, wherein said one or more illumination devices are comprised of a first light emitting diode, a second light emitting diode and a third light emitting diode positioned across a length of a front end of the horizontal arm adjacent to a lower end.

10. The multi-function attachment assembly of claim 9, wherein said host device is comprised of a laptop computer.

11. The multi-function attachment assembly of claim 9, wherein said horizontal arm includes a feed slot.

12. The multi-function attachment assembly of claim 11, further comprising a scanner within said feed slot, said scanner being adapted to scan said document to said host device.

13. The multi-function attachment assembly of claim 9, wherein said support shaft includes a plurality of frictional members positioned thereon.

14. The multi-function attachment assembly of claim 13, wherein said inner channel includes a plurality of grooves adapted to frictionally engage with said plurality of frictional members.

15. The multi-function attachment assembly of claim 12, further comprising one or more control buttons on said horizontal arm adapted to control said feed slot.

16. A multi-function attachment assembly for a host device, comprising: a support shaft frictionally and slidably secured within an inner channel formed within said host device; a horizontal arm rotationally secured to a distal end of said support shaft, wherein said horizontal arm includes a feed slot; a scanner within said feed slot, said scanner being adapted to scan said document to said host device; one or more document retainers positioned on said horizontal arm, said one or more document retainers to removably secure one or more documents therein; a camera mount rotatably secured to a distal end of said horizontal arm; a camera positioned on said camera mount; a microphone positioned on said camera mount; and one or more light emitting diodes positioned along a length of said horizontal arm.

17. The multi-function attachment assembly of claim 16, wherein said host device is comprised of a mobile computing device.

* * * * *